United States Patent [19]

Tsukahara et al.

[11] Patent Number: 4,752,796
[45] Date of Patent: Jun. 21, 1988

[54] STILL CAMERA

[75] Inventors: Daiki Tsukahara, Kawasaki; Akira Katayama, Koganei, both of Japan

[73] Assignee: Nippon Kogaku K. K., Tokyo, Japan

[21] Appl. No.: 908,816

[22] Filed: Sep. 18, 1986

[30] Foreign Application Priority Data

Sep. 20, 1985 [JP] Japan .................................. 60-209754
Sep. 20, 1985 [JP] Japan .................................. 60-209755
Sep. 24, 1985 [JP] Japan .................................. 60-208754
Sep. 24, 1985 [JP] Japan .................................. 60-208755
Sep. 24, 1985 [JP] Japan .................................. 60-208756

[51] Int. Cl.$^4$ .................. G03B 17/04; G03B 1/00; G03B 17/00
[52] U.S. Cl. .................................. 354/187; 354/202; 354/214
[58] Field of Search ................ 354/187, 195.1, 195.12, 354/202, 214, 288 P

[56] References Cited

U.S. PATENT DOCUMENTS

| 3,616,738 | 11/1971 | Fujita | 354/187 |
| 4,280,762 | 7/1981 | Prochnow | 354/187 |
| 4,336,986 | 6/1982 | Prochnow | 354/187 |

Primary Examiner—Perkey
Attorney, Agent, or Firm—Shapiro and Shapiro

[57] ABSTRACT

The present invention relates to a camera in which photographing lens means is moved along an optical axis thereof between an extended position and a withdrawn position, a lens system of the lens means being protected by protective cover means moved by cover operating means, and being moved by lens operating means, motion of the protecting cover means and the lens system being controlled by control means.

8 Claims, 7 Drawing Sheets

STILL CAMERA

BACKGROUND OF THE INVENTION

1. Field of the Invention.

The present invention relates to a still camera having a photographing lens barrel collapsible with respect a camera housing. 2. Related Background Art A conventional still camera of this type is exemplified by a collapsible barrel type camera disclosed in, e.g., U.S. Pat. No. 4,258,998. In the collapsible barrel type camera, a photographing lens is moved to a position spaced apart from a photographing plane to take a picture. However, when the camera is not used, the photographing lens is moved near the photographing plane. Another conventional still camera of this type is exemplified by a bifocal camera disclosed in, e.g., U.S. Pat. No. 4,597,657. In the bifocal camera, a photographing lens is constituted by a master lens and a conversion lens. A first focal length is obtained by only the master lens. After the master lens is spaced by a predetermined length apart from the photographing plane along the optical axis, the conversion lens is located behind the master lens to obtain a second focal length. In the bifocal camera, in a telephoto mode the master lens is moved to an extended position away from the photographing plane. However, in a wide angle mode, the master lens is moved to a withdrawn position near the photographing plane.

When such cameras are not used, the lens is desirably held in the withdrawn position to protect the lens.

A collapsible lens camera having a protective cover for covering the front surface of the lens is also known, as described in Japanese Patent Disclosure (Kokai) No. 22039/1984. Upon manual operation of the protective cover, the lens is electrically collapsed or extended.

Conventional compact lens shutter cameras each with a flash device are known. The flash device has a light-emitting window to be moved in a direction perpendicular to the optical axis of the lens. The light-emitting window extends from the camera housing so as to achieve picture-taking with the flash device.

SUMMARY OF THE INVENTION

It is a primary object of the present invention to provide a still camera automated to provide good operability as compared with a conventional camera of the type described above.

It is another object of the present invention to provide a collapsible barrel type camera wherein a means for driving a protective cover is synchronized with a means for driving a photographing lens to provide good operability.

It is still another object of the present invention to provide a camera with a lens cover, wherein a protective cover is driven to a closed position in synchronism with film rewinding before the film is rewound.

It is still another object of the present invention to provide a lens shutter camera wherein a manual operation member for moving a lens to an extended position is returned to an initial position when a photographing lens is moved to a proximal position near a photographing plane in response to another automatic operation.

It is still another object of the present invention to provide a flash device built-in camera wherein a photographing lens is driven in synchronism with a light-emitting unit according to a proper relationship.

It is still another object of the present invention to provide a flash device built-in camera wherein a light-emitting unit is collapsible in synchronism with opening/closing of the protective cover.

DESCRIPTION OF THE PREFERRED EMBODIMENTS

Figure 1:
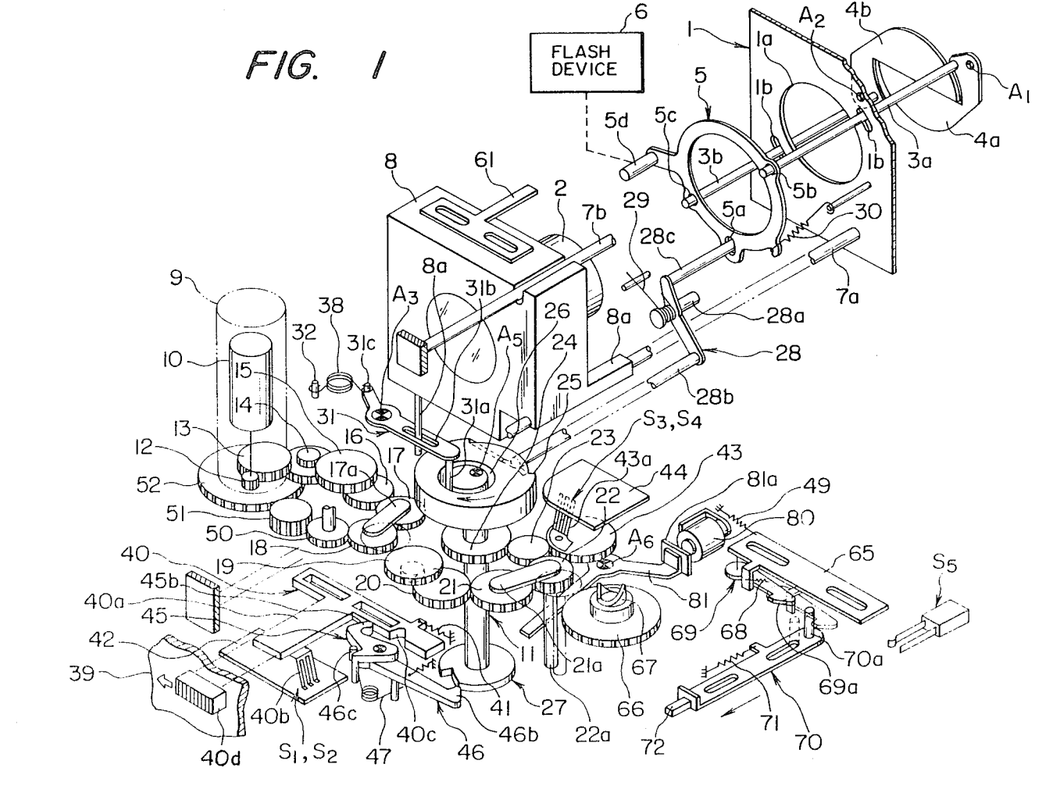
FIG. 1 is an exploded perspective view of a camera mechanism according to an embodiment of the present invention.

FIG. 1 shows an embodiment of a camera according to the present invention. In this embodiment, a single motor arranged in a film rewinding spool performs the following operations: opening/closing of the lens cover; extension/withdrawal of the lens barrel; extension/withdrawal of the flash device light-emitting unit; film winding; charging of the shutter mechanism or the like; and film rewinding.

Throughout the specification, extension of a lens barrel means that a photographing lens arranged in the lens barrel is moved to a remote position away from a photographing plane, and withdrawal of the lens barrel means that the photographing lens is moved together with the lens barrel to a proximal position near the photographing plane but does not mean that the lens barrel is completely withdrawn in the camera housing and that photographing cannot be performed. The extension/withdrawal of the barrel includes the concept of a bifocal camera wherein a photographing lens is constituted by a master lens and a conversion lens, a first focal length is obtained by only the master lens, wherein after the master lens is spaced by a predetermined length apart from the photographing plane along the optical axis, the conversion lens is located behind the master lens to obtain a second focal length, and wherein in a telephoto mode, the master lens is moved to an extended position away from the photographing plane, but in a wide angle mode, the master lens is moved to a withdrawn position near the photographing plane. In addition, the withdrawn position includes a position where the lens barrel extends outward from the camera body.

Throughout the specification, extension of the flash device light-emitting unit means that the light-emitting unit is moved to a position away from the optical axis of the photographing lens, i.e., to a remote position, and withdrawal of the flash device light-emitting unit means that the light-emitting unit is moved to a position near the optical axis of the photographing lens, i.e., to a near position. Withdrawal does not necessarily mean that the light-emitting unit is completely stored in the camera body and that the flash device cannot used in practice. For example, when a picture is taken in the bifocal camera, the light-emitting unit is located nearer to the optical axis of the photographing lens in the wide angle mode than in the telephoto mode.

Referring to FIG. 1, an opening 1a having a larger diameter than the outer diameter of a lens barrel 2 is formed in a base plate 1 fixed to a camera housing (not shown). Two elongated grooves 1b are formed outside the opening 1a in the base plate 1. Rods 3a and 3b are respectively inserted in the elongated grooves 1b. One end of each of the rods 3a and 3b is connected to a corresponding one of lens covers 4a and 4b pivotal about pivot points A1 and A2. The lens covers 4a and 4b serve as protective covers for covering the front surface of the photographing lens. The other end of each of the rods 3a and 3b is coupled to a drive ring 5. A flash device 6 is coupled to the drive ring 5 through a flash device drive system (to be described later).

Rods 7a and 7b extend on the base plate 1. The rod 7a extends through a lens barrel block 8 including a lens barrel 2, a shutter mechanism (not shown) and a focusing control mechanism (not shown). The rod 7b is fitted in a U-shaped groove formed in the block, so that the block 8 can be slidably held. The lens barrel block 8 can be moved together with the photographing lens back and forth on the rods 7a and 7b along the optical axis by means of a lens drive system (to be described in detail later).

The above drive systems will be described in detail below. The cover drive system and the lens drive system have a common cam member 11 rotated by a motor 10 arranged in a film spool 9. A power transmission mechanism from the motor 10 to the cam member 11 is common and referred to as a cam drive system in the following description.

(I) Cam Drive System

A pinion gear 12 mounted on an output shaft of the motor 10 is meshed with a reduction gear 13. The reduction gear 13 is coupled to a sun gear 17 through reduction gears 14 to 16 arranged to sequentially transmit the rotational force of the reduction gear 13. A planet gear 18 is supported by an arm 17a mounted on the sum gear 17. During reverse rotation of the motor 10, the planet gear 18 is meshed with a reduction gear 19. The reduction gear 19 is coupled to a sum gear 21 through a reduction gear 20. A planet gear 22 is arranged for the sum gear 21 through an arm 21a. During motor reverse rotation excluding the film rewind mode, the planet gear 22 is meshed with a gear 23. The gear 23 is meshed with a gear 24 mounted on a shaft of the cam member 11, thereby rotating the cam member 11. The gear 23 is also meshed with a brush gear 43 (to be described later).

The cam member 11 comprises a surface cam formed on a circumferential surface of the uppermost portion and having a lift along the direction of the rotating shaft, a groove cam 26 formed on the upper surface of the uppermost portion, and a cam disc 27 located at the lowermost portion. The cam member 11 is rotatably supported about a pivot point A5 in the camera housing. The surface cam 25 is connected to a cover drive system, and the groove cam 26 is connected to the lens drive system.

(II) Cover Drive System

The cover drive system has a lever 28 axially supported by the base plate 1 through a shaft 28a. A rod 28b extending parallel to the lens cover holding rods 3a and 3b is connected to one end of the lever 28. The distal end of the rod 28b is engaged with the surface cam 25. A rod 28c extending at the opposite side of the rod 28b is connected to the other end of the lever 28. The rod 28c extends through the groove 5a in the drive ring 5. The lever 28 is always biased clockwise by a spring 29 about a shaft 28a.

The drive ring 5 also has two grooves 5b and 5c. The rods 3a and 3b mounted on the lens covers 4a and 4b extend through the grooves 5b and 5c, respectively. The drive ring 5 supported as described above is always biased counterclockwise by a spring 30. The drive ring 5 can be pivoted clockwise or counterclockwise about the optical axis according to the engagement state of the surface cam 25 and the rod 28b. The covers 4a and 4b are opened upon clockwise pivotal movement of the drive ring 5. The covers 4a and 4b can be closed upon counterclockwise pivotal movement of the drive ring 5.

(III) Lens Drive System

The lens drive system has a lever 31 pivotal about a pivot point A3 in the camera housing. A pin 31a extending on one end of the lever 31 is loosely fitted in the groove cam 26. The lever 31 has a groove 31b. A pin 8a extending on the bottom surface of the lens barrel block 8 is inserted in the groove 31b. A pin 31c extends on the other end of the lever 31. A toggle spring 38 is hooked between the pin 31c and a pin 32 extending on the camera housing.

The lever 31 swings about the pivot point A3 upon rotation of the groove cam 26. When the lever 31 is pivoted counterclockwise, the lens barrel block 8 extends along the optical axis. However, when the lever 31 is pivoted clockwise, the lens barrel block 8 is withdrawn along the optical axis.

(IV) Flash Device Drive System

Figure 2:
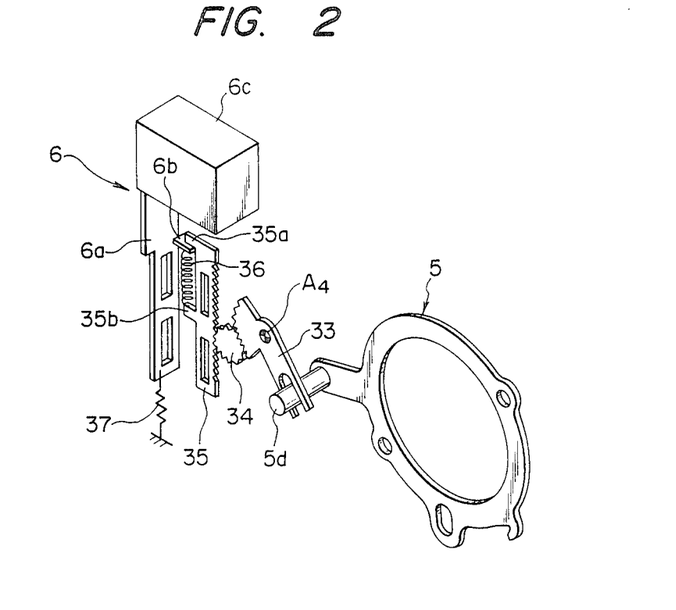
FIG. 2 is a perspective view showing a drive mechanism of a flash device in FIG. 1.

As shown in FIG. 2, the flash device drive system has a lever 33 pivotal about a pivot point A4 in the camera housing. A fork formed at one side of the lever 33 is engaged with a pin 5d extending from the drive ring 5. A gear 34 axially supported by the camera housing is meshed with a gear formed at the other side of the lever 33. The gear 34 is meshed with a rack 35 which is supported by the camera housing to be vertically movable. The light-emitting unit of the flash device 6 is arranged inside the flash device block 6c. A sliding plate 6a extends on the bottom surface of the block 6c. An arm 6b extending from the sliding plate 6a extends between projections 35a and 35b extending from the rack 35. A compression spring 36 is interposed between the arm 6b and the projection 35b. Therefore, the arm 6b is clamped and urged upward by the spring 36 and the projection 35a. When the rack 35 is moved upward, the flash device block 6c is moved upward through the spring 36. However, when the rack 35 is moved downward, the projection 35a urges the arm 6b downward so that the flash device block 6c is moved downward. In this embodiment, the light-emitting unit is not operated when the flash device is held in the withdrawn position. The sliding plate 6a is always biased downward by a tension spring 37 having a smaller biasing force than that of the compression spring 36.

The cam member 11 will be described below.

Figure 3:
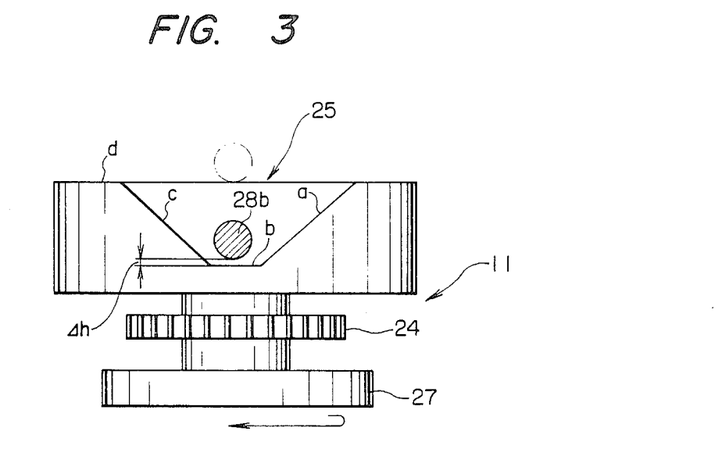
FIG. 3 is a front view of a cam member in FIG. 1.

As shown in FIG. 3, the surface cam 25 comprises an inclined surface a, a flat surface b contiguous with the inclined surface a, and an inclined surface c contiguous with the flat surface b and inclined in a direction opposite the inclined surface a. When the block 8 is located in the withdrawn position, the distal end of the rod 28b is spaced by a distance Δh upward from the flat surface b. While the surface cam 25 is rotated in a direction of an arrow, the rod 28b ascends along the inclined surface c and then descends along the inclined surface c, thereby opening/closing the lens covers 4a and 4b through the drive ring 5.

Figure 4A:
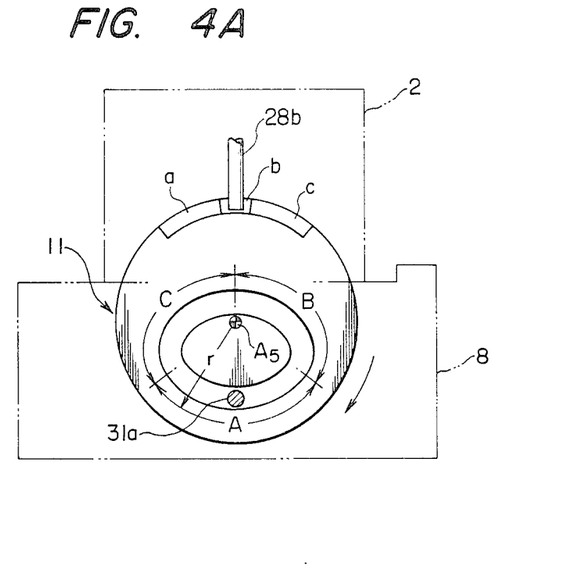
FIGS. 4A and 4B are respectively plan views of the cam member in a lens withdrawn position and a lens extended position.
Figure 4B:
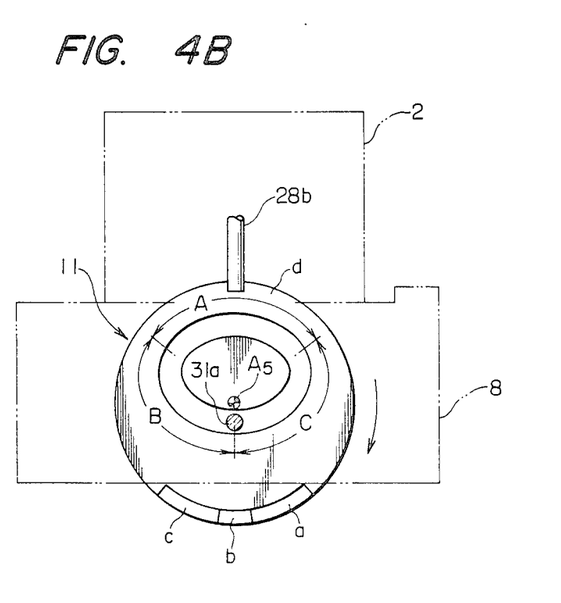

As shown in FIGS. 4A and 4B, the groove cam 26 comprise eccentric circular grooves having centers eccentric from the center A5 of rotation of the cam member 11. The groove cam 26 comprises a groove portion A having a predetermined radius r of curvature about the center A5 of rotation, a cam groove B whose radius of curvature is gradually decreased when the groove cam 26 is rotated clockwise, and a cam groove C whose radius of curvature is gradually increased when the groove cam 26 is rotated clockwise. In the state of FIG. 4A, the lens barrel block 8 is held in the lens withdrawn position. When the groove cam 26 is then rotated in a direction of an arrow and the state of FIG. 4B is obtained, the lens barrel block 8 is held in the lens extended position.

The above system is operated in a first or second mode according to the operation state of the selection lever 40 to be described below.

The selection lever 40 is slidably mounted in the camera housing and is always biased by a spring 41 in the right direction of FIG. 1. The distal end of the lever 40 extends to a camera housing 39 and has a knob 40d thereat. When the knob 40d is moved in a direction of an arrow in FIG. 1, the position of the lever 40 can be shifted to the lens extended position corresponding to the first mode. In order to change the lens extended portion corresponding to the first mode to the lens withdrawn position corresponding to the second mode, the lever 40 is manually moved in a direction opposite to the direction of the arrow. However, as will be described in detail later, when all the film is used up and this state is detected, the lens barrel is automatically shifted to the lens withdrawn position, i.e., the second mode.

A click lever 45 and a lock lever 46 are coaxially supported by the camera housing in association with the selection lever 40. The lock lever 46 is always biased counterclockwise by a spring. The lock lever 46 urges the click lever 45 through a pin 46c, so that the click lever 45 is biased counterclockwise. However, a spring 47 having a relatively small biasing force is hooked between the levers 45 and 46, thereby biasing the click lever 45 clockwise and the lock lever 46 counterclockwise. A ratchet 45b of the click lever 45 abuts against the side wall of the selection lever 40. When the selection lever 40 is operated in the left direction of FIG. 1, the ratchet 45b is engaged with a recess 40c of the lever 40. Therefore, the lever 40 is held in the lens extended position corresponding to the first mode. These members constitute a holding means.

The ratchet 46b of the distal end of the lock lever 46 is urged against the circumferential surface of the cam disc 27. When the cam disc 27 is rotated to the lens extended position, it is fitted in the notch, thereby driving the click lever 45 counterclockwise through the lock portion 46c. The ratchet 45b is removed from the recess 40c of the selection lever 40, and the selection lever 40 is then returned by the spring 41 to the lens withdrawn position corresponding to the second mode. In this embodiment, the above members constitute a lock releasing means.

One frame of the film is automatically wound in response to the shutter release. The film wind drive system will be described hereinafter.

(V) Film Winding Drive System

The pinion gear 12 mounted on the output shaft of the motor 10 is coupled to the planet gear 17 in the same mechanism as the cam drive system. In the film winding mode, the motor 10 is rotated in the forward direction. The arm 17a of the sun gear 17 is pivoted clockwise, and the planet gear 18 is meshed with the gear 50. The gear 50 is coupled to a spool gear 52 at the lower end of the spool 9 through a gear 51.

The shutter mechanism is charged for the next photographing cycle in response to film winding. The charging mechanism will be described below.

(VI) Charging Mechanism

Figure 5:
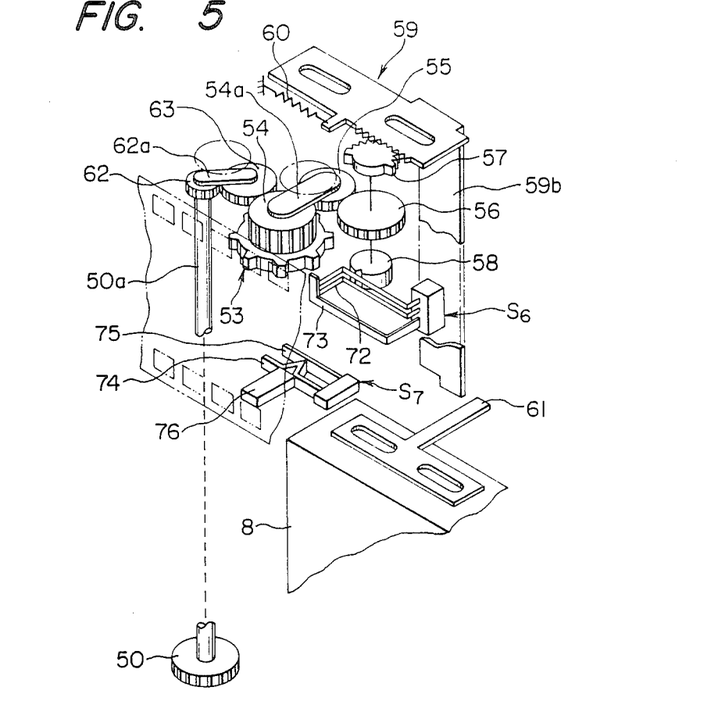
FIG. 5 is a perspective view of a charge mechanism of the camera in FIG. 1.

Referring to FIG. 5, an arm 54a is mounted on a sun gear 54 coaxial with a sprocket 53 arranged to be fitted with the perforations of the film. A planet gear 55 rotatable with respect to the arm 54a is mounted on the distal end of the arm 54a while the gear 55 is meshed with the sun gear 54. A charge gear 56 is disposed to be meshed with the planet gear 55. A sector gear 57 is coaxially mounted above the gear 56, and a switch cam 58 is coaxially mounted below the gear 56. The sector gear 57 is meshed with a rack of the charge member 59 slidable with respect to the camera housing. The charge member 59 is always biased in the left direction by a spring 60 and is slid in the right direction by the sector gear 57. The charge member 59 has an arm 59b bent downward. The arm 59b is engaged with a running plate 61 slidably arranged in the lens barrel block 8. The running plate 61 is driven to charge the shutter mechanism and the autofocusing control mechanism in the lens barrel block 8 so as to prepare for the next shutter release cycle.

In this embodiment, the following mechanism is arranged in order to rotate the gear 56 to obtain a motor stop signal from a switch S6 (to be described later) even if the film is not loaded in the camera body.

A sun gear 62 is fixed to the gear 50 through a rod 50a, and a planet gear 63 is meshed with the sun gear 62 through an arm 62a. Upon clockwise rotation of the sun gear 62, the arm 62a is pivoted clockwise, and the planet gear 63 is meshed with the gear 54. The numbers of gear teeth are determined such that the rotational speed of the planet gear 63 driven by the motor 10 is lower than the feed speed of the film by the sprocket 53.

In the camera of this embodiment, there is also provided a rewinding drive system driven in synchronism with complete winding of the film or with manual operation of a rewinding lever 65.

(VII) Rewinding Drive System

The rewinding drive system has the same drive system as that from the pinion gear 12 mounted on the output shaft of the motor 10 to the planet gear 22. The planet gear 22 is meshed with a gear 66 in synchronism with the operation of the rewinding lever 65. A fork 67 is mounted on the gear 66 to be engaged with the spool of the film cartridge.

The rewinding lever 65 is slidably mounted in the camera housing and is always biased in the left direction by the spring 49. A switch S5 is arranged on a moving track of the rewinding lever 65. A magnet 80 is energized in response to a logical AND signal of a rewinding signal from the switch S5 and a signal from a switch S3 (to be described in detail later) for detecting a lens position. An armature 81a attracted to the magnet 80 is mounted at one end of a changeover lever 81 and an arm engaged with a leg 22a of the planet gear 22 is formed at the other end of the changeover lever 81. The changeover lever 81 is pivotal about a pivot point A6.

Figure 6A:
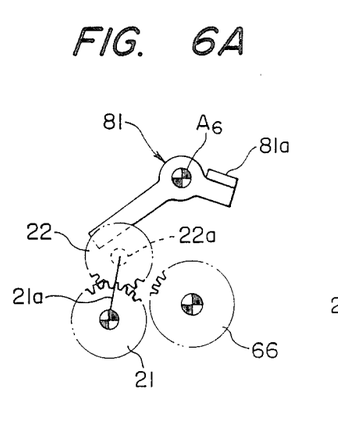
FIGS. 6A and 6B are respectively plan views of a film rewinding mechanism of FIG. 1 in the film wound and rewound states.
Figure 6B:
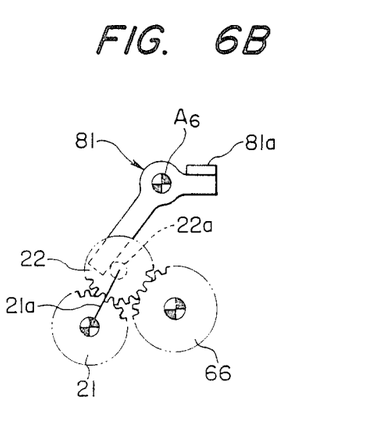

The lever 81 is always biased clockwise by a spring (not shown). The changeover lever 81 is separated from the leg 22a of the planet gear 22 in a mode excluding the rewinding mode, as shown in FIG. 6A. The planet gear 22 is meshed with the gear 23 upon reverse rotation of the motor 10. In the rewinding mode, the magnet 80 is excited and the changeover lever 81 is pivoted counterclockwise to urge the planet gear leg 22a, as shown in FIG. 6B. The planet gear 22 is meshed with the rewinding gear 66.

A lock lever 69 which is always biased clockwise by a spring 68 is swingably mounted on the rewinding lever 65. When the lever 65 is moved to the rewinding position, a hook 69a of the lock lever 69 is locked to a pin 70a of a reset lever 70 slidable along the camera housing, as indicated by the imaginary line of FIG. 1. Therefore, the rewinding lever 65 is locked at this position, i.e., the rewinding position. The reset lever 70 is always biased by a spring 71 in a direction of an arrow. The movement of the reset lever 70 is limited by a stopper 72 extending on a camera rear cover (not shown).

Figure 7:
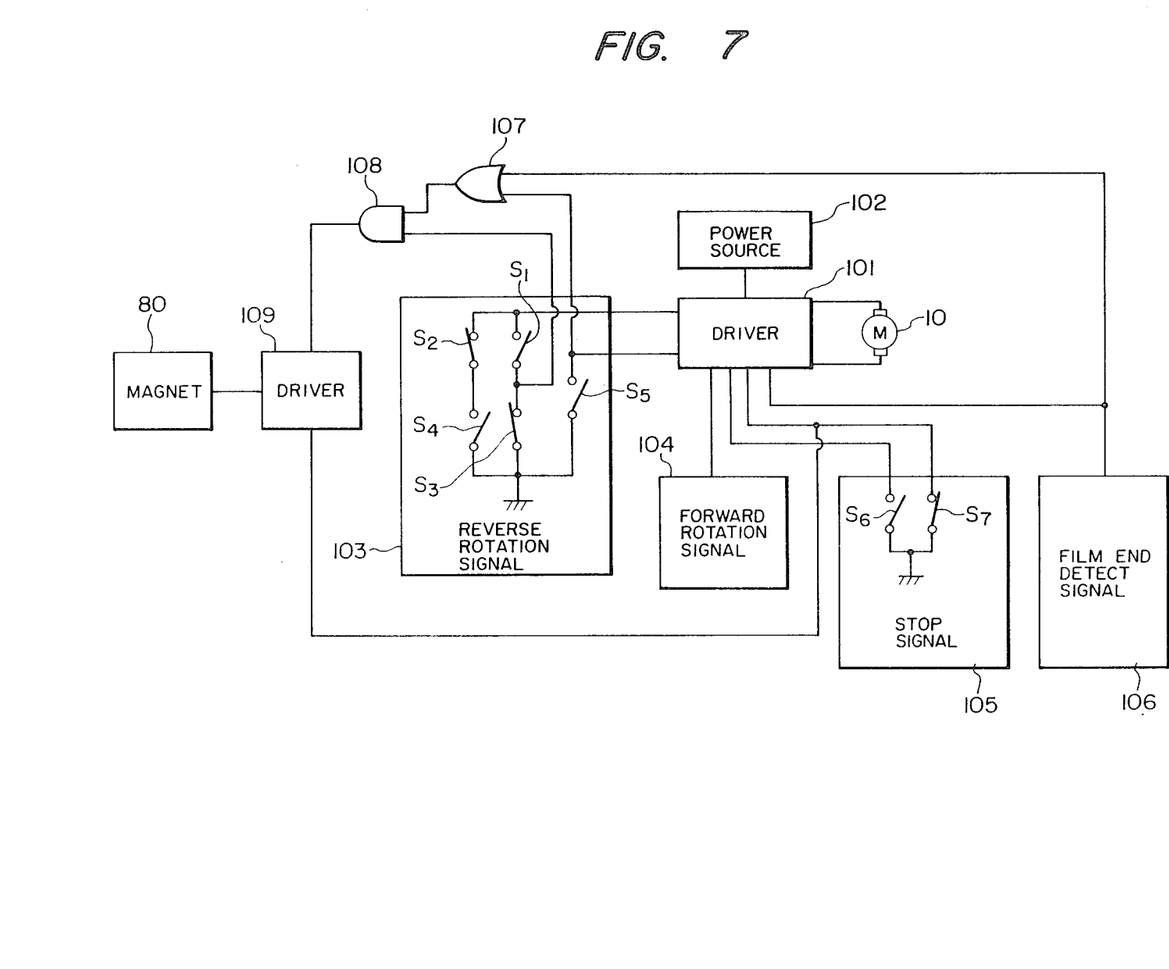
FIG. 7 is a block diagram of a motor control system.

FIG. 7 is a block diagram of a motor control system in the embodiment described above. The respective drive systems are controlled by using forward and reverse rotations of the motor 10.

Forward Rotation:
  Film winding (charging of a shutter mechanism or the like)
Reverse Rotation:
  Film rewinding, opening/closing of the lens cover, extension/withdrawal of the lens barrel block, and extension/withdrawal of the flash device Referring to FIG. 7, a power source 102 is connected to a driver 101 for controlling rotation of the motor 10. The driver 101 is also connected to a reverse rotation signal generator 103, a forward rotation signal generator 104, a stop signal generator 105, and a film end detect signal generator 106.

A rewinding signal from the switch S5 turned on/off by the rewinding lever 65 is connected to an AND gate 108 through an OR gate 107. An end detect signal output from the end detect signal generator 106 is also input to the AND gate 108 through the OR gate 107. A signal from the switch S3 turned on when the lens barrel is held in the withdrawn position is input to the AND gate 108. An output from the AND gate 108 is input to a magnet driver 109. The driver 109 receives a signal from a switch S7 turned off when the film is completely rewound. An output from the driver 109 is supplied to the magnet 80 so as to energize or deenergize it.

The components of the motor control system will be described.

The reverse rotation signal generator 103 comprises switches S1 and S2 for detecting the position of the selection lever 40, the switches S3 and S4 for detecting the position of the lens barrel block 8, and the switch S5 for detecting the position of the rewinding lever 65.

Referring to FIG. 1, the arm 40a is formed on the lever 40. A brush 40b arranged on the arm 40a is slid along a pattern formed on a printed circuit board 42. The lens withdrawn position biased by the spring 41 corresponds to the withdrawn position of the lens barrel block 8. The lens extended position set upon shifting of the lever 40 in the left direction against the biasing force of the spring 41 corresponds to the extended position of the lens barrel block 8.

Figure 8:
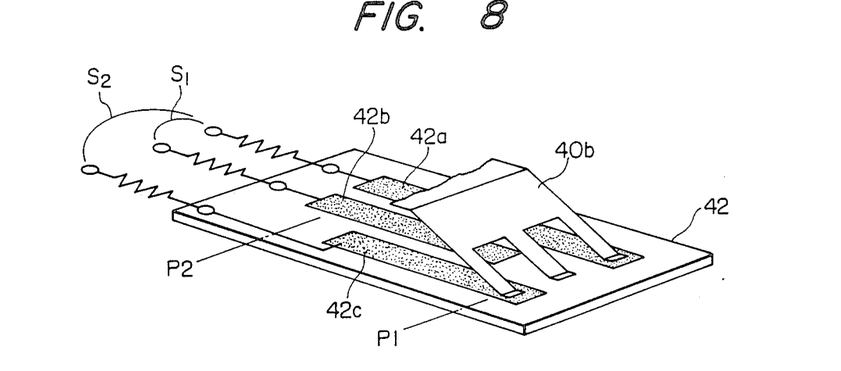
FIG. 8 is a perspective view of a lens position selection switch.

As shown in FIG. 8, three conductor patterns 42a (common pattern) 42b, and 42c are formed on the printed circuit board 42. The brush 40b is slid along the conductor patterns. In the lens withdrawn position P1, the switch S1 consisting of the conductor patterns 42a and 42b is opened. However, the switch S2 consisting of the conductor patterns 42a and 42c is turned on. In the lens extended position P2, the switch S1 is closed but the switch S2 is opened.

Figure 9:
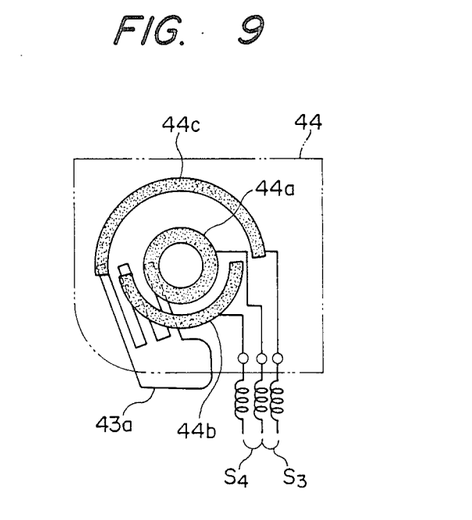
FIG. 9 is a plan view of a lens position detection switch.

When the selection lever 40 is moved from the lens withdrawn position to the lens extended position, the lens barrel block 8 is accordingly moved from the withdrawn position to the extended position. The switches S3 and S4 for electrically detecting the position of the lens barrel block 8 are constituted by a gear 43 with a brush 43a and an opposing printed circuit board 44, as shown in FIG. 1. The gear 43 is meshed with the gear 23 and is revolved once upon one revolution of the cam member 11. The brush 43a is mounted on the upper surface of the gear 43. As shown in FIG. 9, conductor patterns 44a to 44c are formed on the printed circuit board 44. The patterns 44a and 44c constitute a switch S3, and the patterns 44a and 44b constitute a switch S4. The pattern 44a is grounded.

FIG. 9 shows operation states of the switches S3 and S4 when the lens is located in the withdrawn position. In this case, the switch S4 constituted by the conductor patterns 44a and 44b is open, and the switch S3 constituted by the conductor patterns 44a and 44c is closed. When the cam member 11 is rotated through 180° to move the lens barrel block 8 to the lens extended position, the switch S4 is turned on and the switch S3 is turned off.

When the lever 65 is moved in the right direction in FIG. 1 to rewind the film, the switch S5 is closed to rotate the motor 10 in the reverse direction.

The motor stop signal generator 105 comprises a switch S6 which is turned on upon winding of one frame of the film and a switch S7 which is turned off upon complete rewinding of the film.

Referring to FIG. 5, a contact piece 72 is always in contact with the switch cam 58 coaxial with the charge gear 56. The contact piece 72 is separated from a contact piece 73, so that the switch S6 is open. When the film is wound by one frame, the projection of the switch cam 58 urges the contact piece 72, and the contact piece 72 is brought into contact with the contact piece 73 to turn on the switch S6, thereby stopping the motor 10.

Referring to FIG. 5, the switch S7 is arranged along the film feed path to detect the end of film rewinding. When the film is completely rewound, the switch S7 is opened to deenergize the motor 10. The contact piece 74 is always biased toward the film surface. While a detection pin 76 formed on the contact piece 74 is in contact with the film, the contact piece 74 is in contact with a contact piece 75. However, when the film is rewound and the detection pin 76 is separated therefrom and extends backward with respect to the film feed path, the contact piece 74 is separated from the contact piece 75, thereby opening the switch S7.

The operation of the collapsible barrel type camera according to this embodiment will be described below.

(I) Opening of Cover, Extension of Lens, and Extension of Flash Device

When the selection lever 40 is manually moved in the left direction so as to extend the photographing lens, the ratchet 45b of the click lever 45 is engaged with the recess 40c of the lever 40. The lever 40 is held in this position, and the brush 40b is slid along the printed circuit board 42 to close the switch S1 and open the switch S2. If the photographing lens is located in the withdrawn position and the detection switch S3 is closed, the motor reverse rotation signal is supplied to the driver 101 through the switches S1 and S3 in FIG. 7. As a result, the motor 10 is rotated in the reverse direction.

When the motor 10 is rotated in the reverse direction, the rotational force is transmitted to the sun gear 17 through the pinion gear 12 and the reduction gears 14 to 16. Since the sun gear 17 is rotated counterclockwise, the arm 17a is pivoted counterclockwise to cause the planet gear 18 to mesh with the gear 19. The rotational force of the gear 19 is also transmitted to the sun gear 21 through the gear 20 to pivot the arm 21a counterclockwise, thereby meshing the planet gear 22 with the gear 23. As a result, the cam member 11 and hence the gear 43 are rotated clockwise.

Upon clockwise rotation of the cam member 11, the rod 28b constituting the cover drive system is moved upward along the inclined surface a of the surface cam 25. The lever 28 is then pivoted counterclockwise. Upon this pivotal movement, the drive ring 5 is rotated clockwise so that the lens covers 4a and 4b are opened through the rods 3a and 3b.

In this case, since the lever 33 of the flash device drive system coupled to the drive ring 5 is pivoted counterclockwise, the gear 34 is rotated clockwise to move the rack 35 upward. The flash device block 6c is then moved upward through the spring 36. In this case, the transmission force of the rack 35 is absorbed by the spring 36 even if the flash device block 6c is prevented from being moved upward. As a result, the flash device drive mechanism is not damaged.

When the cam member 11 is further rotated, the rod 28b is placed on the upper surface d of the surface cam 25. The pivotal movement of the lever 28b is stopped, so that the drive ring 5 is no longer pivoted and that the covers 4a and 4b are completely opened.

Meanwhile, the groove B of the groove cam 26 causes the lever 31 to pivot counterclockwise through the pin 31a. Upon movement of the lever 31, the lens barrel block 8 is guided by the rods 7a and 7b and is moved forward. When the lever 31 and hence the toggle spring 38 are rotated exceeding its upper dead center, the lens barrel block 8 is further moved forward while being biased by the toggle spring 38. When the groove cam is rotated through 180° and reaches a position in FIG. 4B, the projection 8a of the lens barrel block 8 abuts against the base plate 1. In this case, the brush 43a has rotated through 180° from the state of FIG. 9. The switch S3 is turned off, and the switch S4 is turned on. The reverse rotation signal is disabled to stop the motor 10. Therefore, the cam member 11 and the gear 43 are thus stopped.

(II) Film Winding

A picture is taken upon shutter release. A forward rotation signal is output form the forward rotation signal generator 104 to rotate the motor 10 in the forward direction. The rotation of the motor 10 is transmitted to the sun gear 17 through the pinion gear 12 and the reduction gears 13 to 16. In this case, since the sun gear 17 is rotated clockwise, the arm 17a is pivoted clockwise. The planet gear 18 is meshed with the gear 50. The rotational force of the motor 10 is further transmitted to the spool gear 52 through the gear 51. The spool 9 is thus rotated to wind the film.

When the sprocket 53 is rotated clockwise upon feeding of the film, the arm 54a mounted on the gear 54 integrally formed with the sprocket 53 is rotated clockwise, so that the planet gear 55 supported by the arm 54a is meshed with the charge gear 56. The sector gear 57 is rotated to shift the charge member 59 in the right direction. The running plate 61 arranged on the lens barrel block 8 is driven to charge the shutter mechanism or the like.

When the sector gear 57 is further rotated and its notch faces the rack, the charge member 59 is returned to the initial position by the spring 60. Along with this movement, the rotating cam 58 brings the contact piece 72 into contact with the contact piece 73 upon winding of one frame of the film. The switch S6 is turned on to supply a stop signal to the driver 101, thereby stopping the motor 10.

The planet gear 63 is also rotated by the gear 62 rotated together with the gear 50. Since the rotational speed of the planet gear 63 is smaller than the rotational speed of the sprocket 53 upon feeding of the film, the gear 63 is not coupled to the gear 54.

(III) Closing of Cover, Withdrawal of Lens, and Withdrawal of Flash Device

In this embodiment, an instruction system for closing the covers 4a and 4b and withdrawing the lens and the flash device block 6c generates a manual instruction using the selection lever 40 and an automatic instruction responding to the end of use of all frames of the film.

When the selection lever 40 held in the lens extension position is operated in the right direction against the clicking force of the click lever 45, that is, when the lens extended position is switched to the lens withdrawn position, the brush 40b is slid along the printed circuit board 42 to open the switch S1 and close the switch S2. In this case, upon extension of the lens, the gear 43 has been stopped at a 180° rotated position from the state of FIG. 9. The switch S3 is open and the switch S4 is closed. Therefore, the reverse rotation signal is sent from the reverse rotation signal generator 103 to the driver 101, and the motor 10 is rotated in the reverse direction.

The cam member 11 is rotated clockwise upon reverse rotation of the motor 10. In the lens extended state, the rod 28b is placed on the upper surface d of the surface cam 25, and the pin 31a is located at the boundary between the grooves B and C, as shown in FIG. 4B. When the cam member 11 is rotated clockwise from the state shown in FIG. 4B, the lever 31 is pivoted clockwise to move the lens barrel block 8 from the extended position to the withdrawn position. When the region of the groove A of the groove cam 26 reaches the pins 31a, backward movement of the lens barrel block 8 is stopped, and this state indicates the lens withdrawn position.

In this case, the start point of the descending inclined surface c is located near the rod 28b. Upon further rotation of the cam member 11, the cam member 11 descends along the inclined surface c by the biasing force of the spring 29, so that the lever 28 is rotated clockwise. The drive ring 5 is pivoted counterclockwise to close the covers 4a and 4b. The movement of the drive ring 5 is also transmitted to the flash device drive system. The arm 35a of the rack 35 directly urges the leg 6a of the flash device block 6c to move the flash device block 6c downward.

When the cam member 11 is further rotated to move the rod 28b downward to the flat surface b of the surface cam 25, the brush 43a of the gear 43 is located, as shown in FIG. 9. The switch S3 is closed and the switch S4 is open. In this case, since the selection switch S1 has already been turned off, the reverse rotation signal is disabled and reverse rotation of the motor 10 is stopped.

When all frames of the film are used up and the film is no longer fed, the known end detect signal generator 106 detects the film end and supplies stop and reverse rotation signals to the driver 101, thereby stopping and rotating the motor 10 in the reverse direction. Upon reverse rotation of the motor 10, the lens barrel block 8 is moved to the lens withdrawn position in the same manner as in the manual instruction. When the lens barrel block 8 reaches the withdrawn position, the lock lever 46 is fitted in the notch 27a of the notched cam 27 of the cam member 11. Upon this movement, the click lever 45 is pivoted counterclockwise to disengage the ratchet 45b of the click lever 45 from the recess 40c of the selection lever 40. The selection lever 40 is moved in the right direction by the spring 41 and is returned to the lens withdrawn position. Therefore, the switch S1 is opened and the motor 10 is stopped.

(IV) Film Rewinding

In this embodiment, when all the frames of the film are used up and the film is no longer fed, the signal generator 106 generates the film end detect signal. In response this signal, the film is automatically rewound. In addition, the film may be rewound by a manual operation using the rewinding lever 65. Automatic rewinding is first described.

When the film end detect signal is output while the lens barrel block 8 is held in the extended position, the motor 10 starts rotating in the reverse direction in response to this signal. The lens barrel block 8 is moved toward the withdrawn position in the same manner as described above. When the lens barrel block 8 reaches the withdrawn position, the switch S3 is closed and the switch S4 is opened.

In this case, the two input terminals of the AND gate 108 respectively receive the signal from the switch S3 and the film end detect signal through the OR gate 107. A signal is then supplied from the AND gate 108 to the magnet driver 109 to excite the magnet 80. The armature 81a is then attracted to the magnet 80, and the changeover lever 81 is pivoted counterclockwise to urge the leg 22a of the planet gear 22, as shown in FIG. 6B. Therefore, the planet gear 22 is meshed with the rewinding gear 66.

The film end detect signal is also supplied to the driver 101 to rotate the motor 10 in the reverse direction. The film end detect signal and the signal from the switch S3 serve as the rewinding signals.

The planet gear 18 is meshed with the gear 19 to transmit the rotational force of the motor 10 to the sun gear 21. This rotational force is transmitted to the planet gear 22 and the rewinding gear 66 to rewind the film.

Upon rewinding of the film, the spool 9 and then the gear 50 are rotated so that the rod 50a is rotated counterclockwise through the rod 50a. The planet gear 63 supported by the arm 62a is separated from the sprocket gear 54. Since the sprocket 53 is rotated counterclockwise, the arm 54a is pivoted counterclockwise to separate the planet gear 55 from the charge gear 56. The charge member 59 is not pivoted during film rewinding, and the cam switch S6 is kept open.

When the film is completely rewound, a film end detection pin 76 is released by the film (since the biasing force of the pin 76 is supported by the taut film), and the switch S7 is turned off. The motor stop signal is supplied to the driver 101 to stop the motor 10.

The open signal from the switch S7 is supplied to the magnet driver 109 to deenergize the magnet 80. The changeover lever 81 is then pivoted clockwise by a spring (not shown) and moved to a position spaced apart from the leg 22a, i.e., a position where meshing between the planet gear 22 and the gear 23 is not interferred.

When the photographing lens is held in the withdrawn position, the film end detect signal is not output, and the automatic rewinding function is not effected. When the lens barrel block 8 is held in the withdrawn position upon film winding, the selection lever 40 is automatically returned to the lens withdrawn position.

In the manual rewinding mode, the film can be rewound regardless of the photographing lens position. More specifically, when the rewinding lever 65 is operated while the photographing lens is held in the extended position, the switch S5 is turned on and the reverse rotation signal is output from the reverse rotation signal generator 103 to rotate the motor 10 in the reverse direction. The lens barrel block 8 is gradually withdrawn in the same manner as described above. When the lens barrel block 8 is completely held in the withdrawn position, the switch S3 is turned on to supply the ON signal to the AND gate 108. In this case, the ON signal of the switch S5 is supplied to the AND gate 108 through the OR gate 107, and an excitation signal is supplied from the AND gate 108 to the magnet driver 109, thereby exciting the magnet 80. The armature 81a is attracted to the magnet 80, and the changeover lever 81 causes the planet gear 22 to rotate so that the gear 22 is meshed with the rewinding gear 66, thereby rewinding the film.

In this case, the signals from the switches S5 and S3 serve as the rewinding signals. When film rewinding is completed, the switch S7 is turned off. The motor 10 is then stopped and the magnet 80 is deenergized.

The selection lever 40 is automatically returned to the lens withdrawal position in the same manner as described above.

When the rewinding lever 65 is operated while the photographing lens is held in the withdrawn position, the switch S5 is turned on to cause the reverse rotation signal generator 103 to generate the reverse rotation signal, thus rotating the motor 10 in the reverse direction. Since the switch S3 has already been turned on, the ON signal from the switch S3 and the ON signal from the switch S5 are supplied to the AND gate 108. The AND gate 108 outputs the excitation signal to excite the magnet 80. The planet gear 22 is then meshed with the rewinding gear 66 to rewind the film. The film is immediately rewound upon operation of the rewinding lever 65. When the film is completely rewound, the switch S7 is turned off to stop the motor 10 and deenergize the magnet 80 in the same manner as described above.

When the operator opens a camera rear cover (not shown) to remove the film, the pin 72 is moved accordingly. The lock lever 70 urged by the pin 72 is moved by the spring 71 in the direction of the arrow. The lock lever 69 is released from the pin 70a, and the rewinding lever 65 is returned to the initial position by the spring 69.

Figure 10:
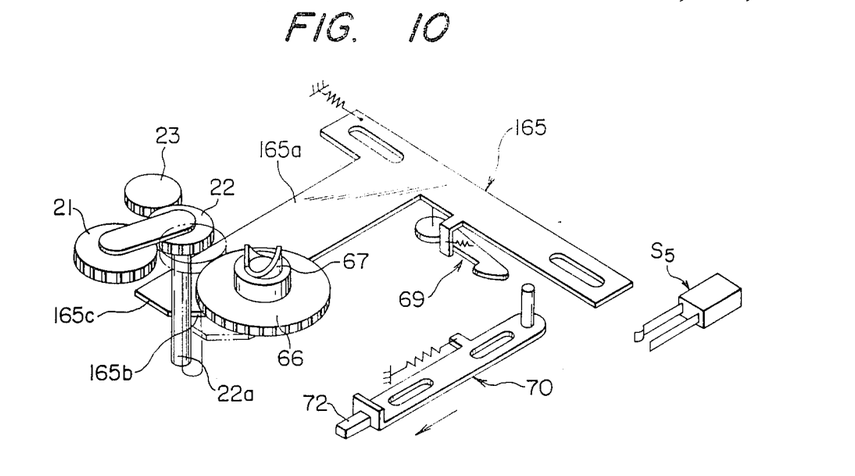
FIG. 10 is a perspective view showing a modification of a film rewinding mechanism.

If the automatic rewinding function is not required, the arrangement in FIG. 10 may be employed. In this case, the mechanism can be simplified. An inclined surface 165b opposite the leg 22a fixed to the planet gear 22 is formed on an arm 165a of a rewinding lever 165 in FIG. 10. When the rewinding lever 165 is moved in the right direction of FIG. 10, the inclined surface 165b urges the leg 22a to rotate the leg 22a clockwise. The leg 22a is thus placed on a flat surface 165c. The planet gear 22 is meshed with the gear 66.

Figure 11:
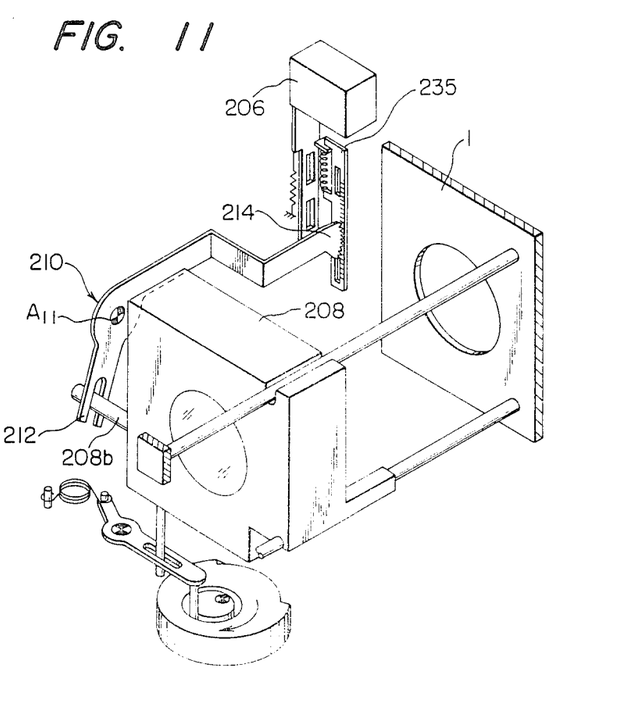
FIG. 11 is a perspective view showing a modification of a flash device drive mechanism.

FIG. 11 shows a modification of a flash device drive system. A pin 208b extends on the side wall of a lens barrel block 208. A fork 212 at the distal end of a drive lever 210 pivotal about a pivot point A11 in the camera housing is engaged with the pin 208b. A gear 214 is formed at the proximal end of the lever 210. The gear 214 is meshed with a rack 235 having the same construction as in the rack 35 in FIG. 2.

When the lens barrel block 208 is moved forward, the drive lever 210 is pivoted counterclockwise. Upon this movement, the gear 214 is moved on the rack 235. Therefore, a flash device block 206 is moved to the extended position spaced apart from the lens optical axis.

In the above embodiment, the cam member 11 is rotated along one direction by using the motor so as to achieve opening/closing of the lens cover, extension/withdrawal of the lens, and extension/withdrawal of the flash device. However, the motor may be rotated in the forward direction to rotate the cam member in the forward direction, thereby performing the various operations described above.

What is claimed is:

1. A camera comprising:
a housing
photographing lens means having a lens system moved along an optical axis thereof between an extended position and a withdrawn position with respect to said housing, and forming a photographing optical path;
protective cover means moved between a covering position where said protective cover means is located on the photographing optical path to cover a front side of said lens system so as to protect said lens system and an uncovering position where said protective cover means is deviated from the photographing optical path;
lens operating means, having a first cam follower, for moving said lens system in response to said first cam follower;
cover operating means, having a second cam follower, for moving said protective cover in response to said second cam follower; and
control means including a cam member having first cam means coupled to said first cam follower and second cam means coupled to said second cam follower, and driving means for driving said cam member to operate said first and second cam followers, said control means being operated in a first mode for controlling said driving means so as to move said lens system from the withdrawn position to the extended position after said protective cover means is moved from the covering position to the uncovering position, and in a second mode for controlling said driving means so as to move said protective cover means from the uncovering position to the covering position after said lens system is moved from the extended position to the withdrawn position.

2. A camera according to claim 1, wherein said driving means includes an electric motor, and said cam member includes a rotary cam rotated by said electric motor.

3. A camera according to claim 1, wherein said first cam means has a cam surface formed on said cam member to drive said first cam follower, and said second cam means has a cam surface formed on said cam member to drive said second cam follower.

4. A camera according to claim 1, wherein said first cam means has first and second cam surfaces for driving said first cam follower to move said lens system to the extended and withdrawn positions, respectively, and third and fourth cam surfaces for driving said second cam follower to move said protective cover means to the uncovering and covering positions, respectively.

5. A camera comprising:
a housing;
photographing lens means having a lens system moved along an optical axis thereof between an extended position and a withdrawn position with respect to said housing, and forming a photographing optical path;
manual operating means having a first state for designating movement of said lens system to the extended position and a second state for designating movement of said lens system to the withdrawn position and mounted on said housing to be switched between the first state and the second state;
driving means for driving said lens system to the extended and withdrawn positions in response to the first and second states of said manual operating means;
means for holding said manual operating means in the first state while said manual operating means is set in the first state;
automatic operating means for operating said driving means independently of said manual operating means and moving said lens system to said withdrawn position; and
releasing means for releasing said manual operating means from said holding means to set said manual operating means in the second state in response to said automatic operating means.

6. A camera according to claim 5, wherein said releasing means is operated by said driving means while said lens system is moved to the withdrawn position.

7. A camera according to claim 5, wherein said camera includes rewinding operating means operated to rewind a film, and said automatic operating means operates said driving means in response to said rewinding operating means.

8. A camera according to claim 5, wherein said camera includes means for detecting an end of exposure of all frames of the film, and said automatic operating means operates said driving means in response to said detecting means.

* * * * *